United States Patent
Pineros

(10) Patent No.: US 11,170,542 B1
(45) Date of Patent: Nov. 9, 2021

(54) BEAM HARDENING AND SCATTER REMOVAL

(71) Applicant: Lickenbrock Technologies LLC, St. Louis, MO (US)

(72) Inventor: Miguel Pineros, St. Louis, MO (US)

(73) Assignee: LICKENBROCK TECHNOLOGIES, LLC, St. Louis, MO (US)

( * ) Notice: Subject to any disclaimer, the term of this patent is extended or adjusted under 35 U.S.C. 154(b) by 124 days.

(21) Appl. No.: 16/596,862

(22) Filed: Oct. 9, 2019

Related U.S. Application Data

(60) Provisional application No. 62/743,647, filed on Oct. 10, 2018.

(51) Int. Cl.
*G01N 23/00* (2006.01)
*G06T 11/00* (2006.01)

(52) U.S. Cl.
CPC .......... *G06T 11/005* (2013.01); *G06T 11/006* (2013.01)

(58) Field of Classification Search
CPC ..... A61B 6/032; A61B 6/5258; A61B 6/5205; A61B 6/5282; A61B 6/4085; A61B 6/466; A61B 6/14; A61B 6/482; A61B 6/5264; A61B 6/5217; A61B 6/583; A61B 6/06; A61B 6/4233; A61B 6/4291; A61B 6/4441; A61B 6/481; A61B 6/03; A61B 6/4435; A61B 6/542; A61B 6/037; A61B 5/1076; A61B 5/4504; A61B 5/726; A61B 5/743; A61B 6/027; A61B 6/4007; A61B 6/4035; A61B 6/488; A61B 6/502; A61B 6/56; A61B 6/584; A61B 6/035; A61B 6/405; A61B 6/545; A61B 6/484; G01N 23/046; G01N 2223/419; G01N 2223/316; G01N 2223/051; G01N 2223/401; G01N 2223/423; G01N 23/04; G01N 2223/1016; G01N 2223/41; G01N 2223/643; G01N 2223/646; G01N 23/041; G01N 33/381; G01N 2223/612; G01N 23/087; G01N 21/00; G01N 23/18; G01N 2223/076; G01N 2223/206; G01N 2223/3032; G01N 2223/309; G01N 2223/313; G01N 2223/408; G06T 11/008; G06T 11/005; G06T 2207/10081; G06T 2211/432; G06T 7/0012; G06T 2207/10072; G06T 2207/30164; G06T 7/001; G06T 15/08;

(Continued)

(56) References Cited

U.S. PATENT DOCUMENTS 6,041,132 A * 3/2000 Isaacs ................ G01N 23/046 378/21
2006/0159223 A1 * 7/2006 Wu ........................ A61B 6/032 378/18

(Continued)

*Primary Examiner* — Irakli Kiknadze
(74) *Attorney, Agent, or Firm* — Hoffman Warnick LLC

(57) ABSTRACT

A method for removing artifacts from an image reconstructed from scanner data according to embodiments includes: performing a forward projection p to update an estimated object image; determining a transfer function $f_\theta$ that represents the effect of scatter and beam hardening; modifying the forward projection p using the transfer function $f_\theta$ to provide a modified forward projection p'; and performing an iterative image reconstruction process using the modified forward projection p' to generate a reconstructed image.

19 Claims, 4 Drawing Sheets

(58) Field of Classification Search
CPC ............... G06T 2210/41; G06T 11/006; G06T 2207/10116; G06T 2211/436; G06T 5/002; G06T 7/11; G06T 17/00; G06T 2207/30004; G06T 19/00; G06T 2207/10132; G06T 11/003; G06T 17/20; G06T 2207/20012; G06T 2207/30032; G06T 2207/30064; G06T 2211/421; G06T 27/155; G06T 7/155; G06T 2207/10076; G06T 2207/10112; G06T 2207/20192; G06T 2707/3018; G06T 2211/408; G06T 2211/424; G06T 7/00; G06T 7/0004; G06T 2207/30168; G06N 3/084; G16H 20/40; G16H 40/63; G16H 40/67; H03K 17/9535; G06K 9/00221; G06K 9/00335; G06K 9/00389; G06K 9/00; G06K 9/00214; G06K 9/4604; G06K 9/4671; G06K 9/6211; G06K 2209/05; G06K 9/6224; G06K 9/6218; G01B 11/25; G01B 11/026; G01B 11/2513; H04N 1/407; H04N 1/6027; G09B 23/285; G01J 2003/2826; G01S 17/894; G21K 1/02; G21K 1/04; G21K 1/043; G21K 1/046; G01V 5/0041; G01V 5/005; G06F 3/00; G01T 1/16; G01T 7/005; G01T 1/17; G01T 1/171; G01T 1/24; G01T 1/247

USPC .................................. 378/4, 6, 7, 19, 62, 70

See application file for complete search history.

(56) References Cited

U.S. PATENT DOCUMENTS

| | | | |
|---|---|---|---|
| 2010/0119033 A1* | 5/2010 | Li | A61B 6/06 378/5 |
| 2012/0308100 A1* | 12/2012 | Pack | G06T 11/006 382/131 |
| 2013/0002659 A1* | 1/2013 | Jiang | G06T 11/006 345/419 |
| 2014/0016847 A1* | 1/2014 | Nett | G06T 11/008 382/131 |
| 2017/0055931 A1* | 3/2017 | Paysan | G06T 7/0012 |
| 2018/0182135 A1* | 6/2018 | Lee | A61B 6/032 |
| 2019/0206095 A1* | 7/2019 | Xing | G06T 11/006 |

* cited by examiner

BEAM HARDENING AND SCATTER REMOVAL

STATEMENT REGARDING FEDERALLY SPONSORED RESEARCH OR DEVELOPMENT

This invention was made with government support under contract FA8604-16-C-7008 awarded by the United States Air Force. The government has certain rights.

TECHNICAL FIELD

The present disclosure relates generally to computed tomography, and more particularly to a method of removing beam hardening and scatter artifacts from CT image reconstruction.

RELATED ART

Computed tomography (CT) is an imaging technique in which multiple X-ray images of an object are acquired from different view angles. The collection of X-ray images allows a computer to create a model of the object by utilizing algorithms (software programs) that vary in terms of output quality and execution speed. The model can be a 2D or 3D image reconstruction of the original object depending on the data-acquisition geometries and properties (e.g., size, cost, power) of the CT scanner utilized. CT is widely used in medical applications to diagnose patients, and in the manufacturing industry to carry out Non-Destructive Testing (NDT).

CT images may be reconstructed using, for example, analytical and iterative reconstruction algorithms. Analytical algorithms are based on mathematical equations, which theoretically solve the image reconstruction problem by modeling the scanner data-acquisition. Iterative algorithms, however, are sometimes based on statistical criteria and objective functions using optimization techniques. Such iterative algorithms typically provide higher image quality reconstructions compared to ordinary image reconstruction algorithms, but are also more computationally expensive.

One common analytical algorithm used by commercial CT scanners is called Filter Back Projection (FBP). The original algorithm was developed in the 1970s, followed by multiple variations in subsequent years, such as the Feldkamp-Davis algorithm, which was developed for a particular type of scanner geometry called cone-beam.

Iterative algorithms build the image of an object, or image estimate, by comparing the CT scanner data with a current image estimate. These variables are related by a mathematical function or cost function (e.g., I-divergency), which is optimized in each iteration, and also utilized to update the image estimate.

Regardless of the algorithm utilized to reconstruct CT images, two physical phenomena may occur when scanning certain objects with X-rays, and in particular metallic objects: 1) beam-hardening; and 2) scatter. With beam hardening, a portion of the energy of the X-ray beam is absorbed by the object instead of just passing through it. The X-ray beam is polychromatic and the lower-energy X-rays are preferentially absorbed compared to the higher-energy X-rays. As a consequence, more energy than expected is received by the X-ray detector in those regions where the X-ray beam finds more material or denser material. The beam hardening effect is visible, for example, as a change in intensity towards the center of the object. This intensity change is not a real property of the object, but is an undesired effect of the X-rays.

The second effect that normally occurs when scanning certain objects with X-rays is scatter, where part of the X-ray beam is deviated from its original input angle by free (or lossy) electrons within the object. As a consequence, part of the X-ray beam exits the object with a different angle, and thus incorrectly describes the object scanned. Due to this effect, the object in the CT reconstruction has artifacts, or false features, typically visible as streaks.

Depending on the application, scatter and beam hardening may have a negative impact on CT image reconstruction. For NDT Testing applications for example, beam hardening could lead to making false conclusions about the density of the material being inspected. X-ray scatter, on the other hand, could hide true features or create false artifacts in the object.

Several approaches have been developed to remove beam hardening and/or scatter from CT image reconstructions. One hardware-based approach includes additional elements in the X-ray scanner in order to reduce scatter, for example collimators in front of the detector. These collimators are arrays of small plates aligned to the X-ray source, which block all the incident beams that are not parallel to the line projected from the X-ray source to a particular detector cell.

Another approach for removing scatter and beam hardening uses analytical algorithms, which typically model the physics behind the scatter generation. Complex calculations and/or Monte Carlo simulations estimate the scatter distribution registered by the detector upon the view angle and the geometry of the object. Some of these techniques are designed for specific materials, object shapes, scanner types, etc. For example, scatter removal can be achieved by utilizing segmentation techniques that isolate the object from the background, which in other words means that all the background is considered scatter and must be removed.

Other approaches for removing scatter and beam hardening artifacts use a combination of the two previous approaches. The object is typically scanned utilizing an X-ray beam blocker (hardware), then an analytical technique is utilized to estimate the scatter distribution and to fill in any missing information.

SUMMARY

A first aspect of the disclosure provides a method for removing artifacts from an image reconstructed from scanner data, including: performing a forward projection p to update an estimated object image; determining a transfer function $f_\theta$; modifying the forward projection p using the transfer function $f_\theta$ to provide a modified forward projection p'; and performing an iterative image reconstruction process using the modified forward projection p' to generate a reconstructed image.

A second aspect of the disclosure provides a method for removing artifacts from a reconstructed image, including: determining an inverse of a transfer function $f_\theta$; modifying scanner data d using the inverse transfer function $f'_\theta$ to obtain modified scanner data d'; and performing an iterative image reconstruction process using the modified scanner data d' to generate a reconstructed image, wherein scatter and beam hardening artifacts are removed from the reconstructed image.

BRIEF DESCRIPTION OF THE DRAWINGS

These and other features of the disclosure will be more readily understood from the following detailed description taken in conjunction with the accompanying drawings that depict various aspects of the invention.

Figure 1:
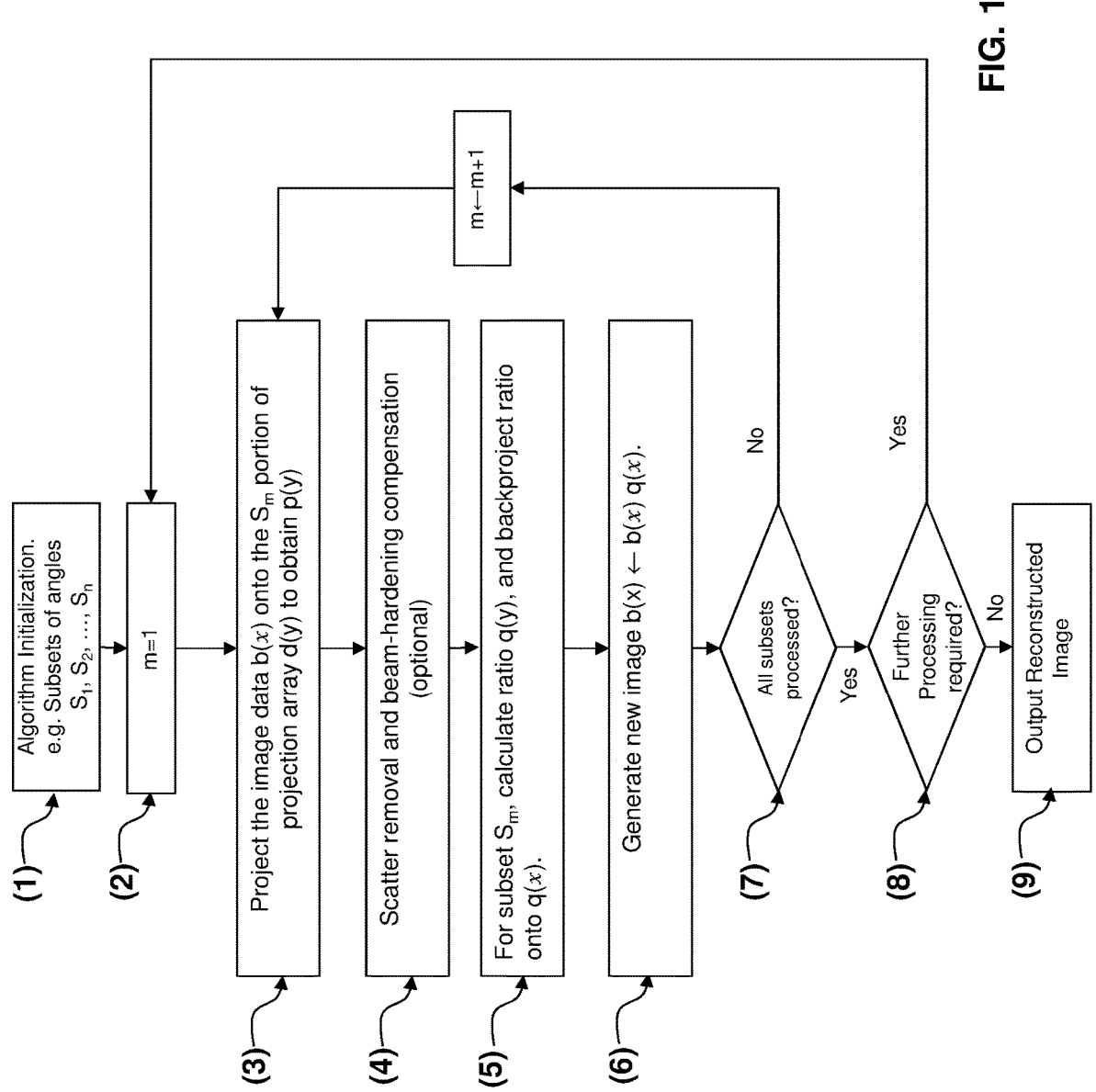
FIG. 1 depicts the Fast Expectation Maximization Ordered Subset (FEMOS) iterative algorithm according to embodiments.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

The present disclosure is directed to a technique for removing scatter and beam hardening artifacts that does not utilize any additional hardware nor model the physics of these phenomena. This technique relies only on the scanner data, and can be applied to any iterative CT image reconstruction algorithm that employs a forward projection operation. In addition, the technique may be utilized to pre-correct scanner data. Once pre-corrected, any other CT image reconstruction algorithms such as Filter Back Projection can be applied to obtain a scatter-free image from the scanner data.

One example of an iterative CT image reconstruction algorithm that employs a forward projection operation is described in U.S. Pat. No. 9,801,591, which is incorporated herein in its entirety by reference. This iterative algorithm is known as Fast Expectation Maximization Ordered Subset (FEMOS), a functional block diagram of which is depicted in FIG. 1.

In the description below, reference is made to the following variables:

x Spatial coordinate of the image. For 2D CT images $x=(x_1,x_2)$, for 3D CT images (volume) $x=(x_1,x_2,x_3)$, where $x_1$, $x_2$ and $x_3$ are the Cartesian coordinates b(x) Estimated Image or image guess.

y Variable that indexes source-detector pairs. For example, in a fan-beam scanner, y is given in terms of polar coordinates $(r,\theta)$; in a cone-beam scanner, y is the 2D spatial coordinate of the pixel in the radiograph and the view angle $\theta$.

$\theta$ Scanner view angle.

r Linear coordinate relative to the center of the detector, used to represent the parallel beam and fan beam type CT scanners (see Radon Transform).

p(y) Forward projection of the current estimated image.

d(y) Scanner data.

q(y)

$$\text{Ratio or quotient defined as} = \frac{d(y)}{p(y)}.$$

q(x) The ratio q(y) is back-projected to the spatial coordinate space of the image x.

h(y|x) Coefficient that enables expressing the forward projection operator as a linear summation operation. It is the fraction of linear-attenuation coefficient combination at pixel x that contributes to the projection sample at y. It may be thought of as an interpolation coefficient. If the blur due to the detector size is dominant, it may also be thought of as point-spread function or impulse response. In a strict sense, it is both.

$f_\theta(\ )$ Transfer function that transforms projections p(y) into estimated scattered projections p'(y), obtained from estimating the best fit between the collection of projection samples p(y) at a particular view angle $\theta$ and the collected CT data d(y) at the same view angle.

p'(y) The result of applying the transfer function $f_\theta(\ )$ to p(y): $p'(y)=f_\theta(p(y))$.

$f_\theta^{-1}(p')$ Inverse of the transfer function $f_\theta(\ )$—i.e., $p(y)=f_\theta^{-1}(p'(y))$.

FEMOS is initialized in steps 1 and 2. Steps 3, 4, 5 and 6 are executed in each iteration: (3) the current image guess (b(x)) is forward projected to obtain p(y) for a particular angle view $\theta$; (4) this step is optional and performs scatter reduction and beam-hardening compensation; (5) the ratio q(y) between the scanner data d(y) and p(y) is calculated, and the ratio q(y) is then back projected to obtain q(x); and (6) the actual guess b(x) is updated by multiplying q(x). This cycle is repeated in each of the iterations within a subset of angles $\theta$ (steps 7 and 8). Finally, at step 9, a reconstructed image is outputted (e.g., on a display).

The ratio quantity q(y) is an operator that compares the reprojected and scatter-transformed quantity to the collected CT data. It is just one way of doing such a comparison. Many other types of comparisons, besides a ratio, may be effective. For example, the compared quantities may be subtracted. The quantity outputted by the comparison may be taken to a power that is greater or lesser than 1 to amplify or dampen the effect of the comparison, respectively.

The "forward projection" operation is based on the Radon Transform, a well-known mathematical operation that can be thought as the data conversion from Cartesian coordinates $x=(x,y)$ to polar coordinates $y=(r,\theta)$ for fan-beam scanners. Forward projection (FP) has been defined in terms of the photons received by the detector:

$$FP(y) = I_o(y, E)\exp\left\{\sum_{x \in X} h(y|x)\mu(x, E)\right\} \quad (1)$$

where h(y|x) is fraction of the value of $\mu(x, E)$ that contributes to the projection at angle $\theta$. It is sometimes referred to as a point-spread function. The term $\mu$ is the attenuation coefficient, E is the scanner energy level, $I_o$ is the mean detector reading in the absence of attenuation and background, and X is the set of x that contribute to the detector location and angle indicated by y. "Back projection," on the other hand, is based on the inverse Radon Transform, which performs the reverse operation.

According to the present disclosure, scanner data, and an estimated forward projection of the object, or reprojection, are used to remove scatter and correct beam hardening artifacts. In any iterative CT reconstruction algorithm that calculates a forward projection to update an estimated object image, an extra step is introduced in which the forward projection is modified according to a transfer function.

Figure 2:
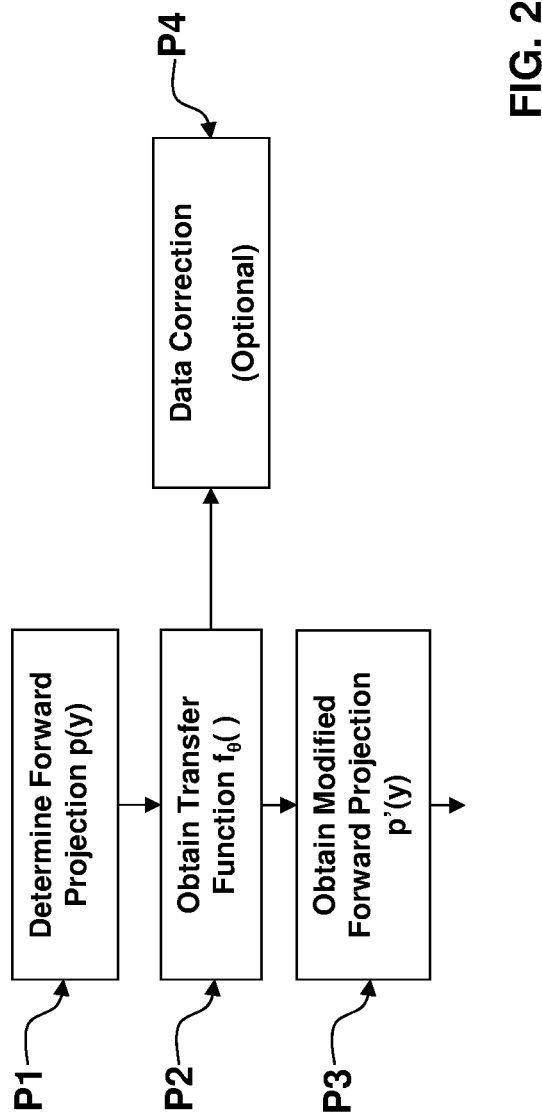
FIG. 2 depicts a flow diagram of a process for removing beam hardening and scatter artifacts from a CT image reconstruction according to embodiments.

A flow diagram of a process for removing beam hardening and scatter artifacts from a CT image reconstruction according to embodiments of the disclosure is depicted in FIG. 2.

P1, P2 and P3 are the tasks required in step 4 of FIG. 1 to produce a CT image reconstruction (FIG. 1, step 9) without beam-hardening and scatter artifacts. At P1, a forward projection p(y) is determined from scanner data using any iterative CT image reconstruction algorithm that employs a forward projection operation. At P2, a transfer function $f_\theta(\ )$ is obtained by calculating the best-fit between the forward projection p(y) and the scanner data.

At P3, the forward projection p(y) is modified to generate p'(y) according to the transfer function $f_\theta(\ )$ where p(y) is the forward projection of the current estimated image for a particular angle, $f_\theta(\ )$ is the transfer function, and y is a variable that indexes source-detector pairs.

$$p'(y) = f_\theta(p(y)) \quad (2)$$

Once p(y) is replaced by p'(y), the rest of the iterative algorithm is executed as originally designed, and beam hardening and scatter artifacts are removed from the reconstructed image so generated.

The transfer function $f_\theta(\ )$ is the mathematical function that has the best fit to a series of data points. These data points are the pairs (p(y),d(y)), where d(y) is the scanner data for every θ.

The best fit can be calculated using any curve fitting technique, and the function can be expressed in terms of any mathematical form, such as polynomials, splines, etc.

Figure 3:
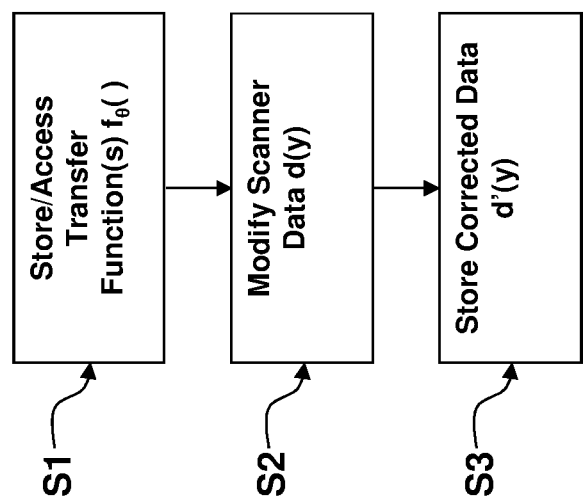
FIG. 3 depicts a flow diagram of a process for correcting scanner data to remove beam hardening and scatter artifacts according to embodiments.

The above-described technique for removing beam hardening and scatter can also be utilized to correct the scanner data by executing the optional step P4 (FIG. 2). A flow diagram of a process for correcting scanner data to remove beam hardening and scatter according to embodiments is depicted in FIG. 3. At S1, the transfer function(s) $f_\theta(\ )$ are stored and/or accessed. At S2, the scanner data d(y) are modified according to the following equation:

$$d'(y) = f_\theta^{-1}(d(y)) \quad (3)$$

where $f_\theta^{-1}(\ )$ is the inverse of the transfer function $f_\theta(\ )$. At S3, the corrected data d'(y) are stored. Once the whole CT image reconstruction is completed at step 9 in FIG. 1, any other CT image reconstruction algorithm can process the corrected data d'(y) in order to deliver an output free of scatter and beam hardening.

The inverse of the transfer function $f_\theta^{-1}(\ )$ can be calculated by any mathematical technique, and it may be coded using a lookup table. In addition, for practicality, the function $f_\theta(\ )$ can be obtained from a downsampled version of the pairs (p(y),d(y)), which may reduce the processing time of the data correction.

Various aspects of the disclosure may be provided as a system, method, and/or computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying various aspects of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments parts of the computer readable program instructions may execute on one or more graphical processing units that may reside on the user's computer or on a remote computer. Such portions of the program instructions may be written using source code that is of the Compute Unified Device Architecture (CUDA), Open-CL or Open-MP language extensions. There are language extensions to C/C++, Python, Fortran and other types of computer languages. Additionally there are many computer language libraries that may be used and that are compatible with GPU's, which may be used for portions of the program instructions. In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the program product of the present invention may be manually loaded directly in a computer system via a storage medium such as a CD, DVD, etc., the program product may also be automatically or semi-automatically deployed into a computer system by sending the program product to a central server or a group of central servers. The program product may then be downloaded into client computers that will execute the program product. Alternatively the program product may be sent directly to a client system via e-mail. The program product may then either be detached to a directory or loaded into a directory by a button on the e-mail that executes a program that detaches the program product into a directory. Another alternative is to send the program product directly to a directory on a client computer hard drive.

Figure 4:
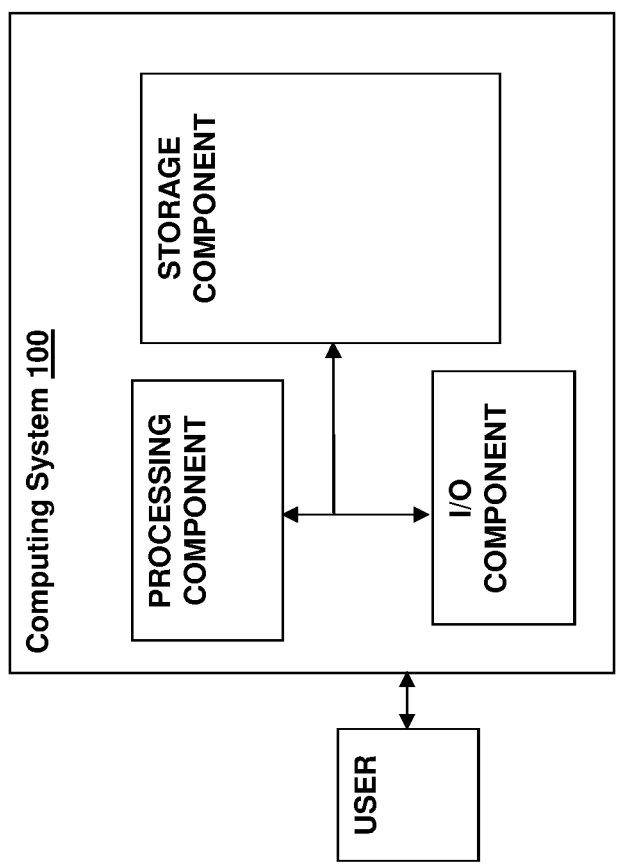
FIG. 4 depicts a computing system for implementing one or more embodiments or aspects thereof disclosed herein.

FIG. 4 depicts an illustrative computing system 100 for implementing various aspects of the present disclosure according to embodiments. The computing system 100 may comprise any type of computing device, and for example includes at least one processor, memory, an input/output (I/O) (e.g., one or more I/O interfaces and/or devices), and a communications pathway. In general, processor(s) execute program code, which is at least partially fixed in memory. While executing program code, processor(s) can process data, which can result in reading and/or writing transformed data from/to memory and/or I/O for further processing. The pathway provides a communications link between each of the components in computing system 100. I/O can comprise one or more human I/O devices (e.g., a display), which enable a user to interact with computing system 100. The computing system 100 is coupled to, or provided as part of, a CT scanning system.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual skilled in the art are included within the scope of the invention as defined by the accompanying claims.

The invention claimed is:

1. A method for removing artifacts from an image reconstructed from scanner data, comprising:
performing a forward projection p to update an estimated object image;
determining a transfer function $f_\theta$, wherein the transfer function $f_\theta$ is obtained by calculating a best-fit between the forward projection p and the scanner data;
modifying the forward projection p using the transfer function $f_\theta$ to provide a modified forward projection p'; and
performing an iterative image reconstruction process using the modified forward projection p' to generate a reconstructed image, wherein scatter and beam hardening artifacts are removed from the reconstructed image.

2. The method of claim 1, further comprising outputting the reconstructed image.

3. The method of claim 1, wherein the scanner data are provided using computed tomography (CT).

4. The method of claim 1, further comprising storing the transfer function $f_\theta$.

5. The method of claim 4, further comprising:
accessing the stored transfer function $f_\theta$;
determining an inverse of the transfer function $f'_\theta$;
modifying additional scanner data using the inverse transfer function $f'_\theta$ to obtain modified scanner data, wherein the modifying of the additional scanner data using the inverse transfer function $f'_\theta$ removes scatter and beam hardening artifacts from the additional scanner data; and
performing any image reconstruction process using the modified scanner data to generate an additional reconstructed image free of scatter and beam hardening artifacts.

6. The method of claim 5, further comprising outputting the additional reconstructed image.

7. The method of claim 5, wherein the additional scanner data is provided using computed tomography (CT).

8. The method of claim 4, wherein the image reconstruction algorithm is a standard FBP or Feldkamp-Davis type algorithm.

9. The method of claim 4, wherein the image reconstruction algorithm is an iterative algorithm.

10. A method for removing artifacts from a reconstructed image, comprising:
determining an inverse of a transfer function $f_\theta$ to obtain an inverse transfer function $f'_\theta$;
modifying scanner data using the inverse transfer function $f'_\theta$ to obtain modified scanner data, wherein the modifying of the scanner data using the inverse transfer function $f'_\theta$ removes scatter and beam hardening artifacts from the scanner data; and
performing an image reconstruction process using the modified scanner data to generate a reconstructed image free of scatter and beam hardening artifacts.

11. The method of claim 10, wherein the image reconstruction algorithm is a standard FBP or Feldkamp-Davis type algorithm.

12. The method of claim 10, wherein the image reconstruction algorithm is an iterative algorithm.

13. The method of claim 10, further comprising outputting the reconstructed image.

14. The method of claim 10, wherein the scanner data is provided using computed tomography (CT).

15. A computer program product stored on a non-transitory computer-readable storage medium, which when executed, performs a method for removing artifacts from an image reconstructed from scanner data, the method comprising:
performing a forward projection p to update an estimated object image;
determining a transfer function $f_\theta$, wherein the transfer function $f_\theta$ is obtained by calculating a best-fit between the forward projection p and the scanner data;
modifying the forward projection p using the transfer function $f_\theta$ to provide a modified forward projection p'; and
performing an iterative image reconstruction process using the modified forward projection p' to generate a reconstructed image, wherein scatter and beam hardening artifacts are removed from the reconstructed image.

16. The program product of claim 15, wherein the method further comprises:
determining an inverse of the transfer function $f'_\theta$;
modifying additional scanner data using the inverse transfer function $f'_\theta$ to obtain modified scanner data; and
performing any image reconstruction process using the modified scanner data to generate an additional reconstructed image free of scatter and beam hardening artifacts.

17. A method for removing scatter and beam hardening artifacts from a reconstructed image obtained from scanner data, comprising:
determining a transfer function $f_\theta$ by calculating a best-fit between a forward projection p and the scanner data;
determining an inverse of the transfer function $f_\theta$ to obtain an inverse transfer function $f'_\theta$;
modifying the scanner data using the inverse transfer function $f'_\theta$ to obtain modified scanner data, wherein the modifying of the scanner data using the inverse transfer function $f'_\theta$ removes scatter and beam hardening artifacts from the scanner data; and
performing an image reconstruction process using the modified scanner data to generate a reconstructed image free of scatter and beam hardening artifacts.

18. The method of claim 17, wherein the scanner data are provided using computed tomography (CT).

19. The method of claim 17, wherein the image reconstruction algorithm is an iterative algorithm.

\* \* \* \* \*